United States Patent
Pan et al.

(10) Patent No.: US 12,131,447 B2
(45) Date of Patent: Oct. 29, 2024

(54) SYSTEM AND PROCESS FOR REPAINTING OF PLANAR OBJECTS IN VIDEO

(71) Applicant: Baidu USA LLC, Sunnyvale, CA (US)

(72) Inventors: Zhihong Pan, San Jose, CA (US); Daming Lu, Dublin, CA (US); Xi Chen, San Jose, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 394 days.

(21) Appl. No.: 17/485,952

(22) Filed: Sep. 27, 2021

(65) Prior Publication Data

US 2023/0100305 A1    Mar. 30, 2023

(51) Int. Cl.
  *G06K 9/00*    (2022.01)
  *G06T 5/77*    (2024.01)
  *G06T 7/73*    (2017.01)

(52) U.S. Cl.
  CPC .............. *G06T 5/77* (2024.01); *G06T 7/73* (2017.01); *G06T 2207/10016* (2013.01); *G06T 2207/20081* (2013.01); *G06T 2207/20084* (2013.01)

(58) Field of Classification Search
  CPC . G06T 5/005; G06T 7/73; G06T 2207/10016; G06T 2207/20081; G06T 2207/20084; G06T 11/00
  See application file for complete search history.

(56) References Cited

U.S. PATENT DOCUMENTS

| | | | | |
|---|---|---|---|---|
| 11,164,384 | B2* | 11/2021 | Huang | G06T 15/506 |
| 11,170,524 | B1* | 11/2021 | Mishra | G06T 5/005 |
| 11,361,505 | B2* | 6/2022 | Grabner | G06F 18/22 |
| 11,430,247 | B2* | 8/2022 | Kokkinos | G06V 10/74 |
| 11,450,051 | B2* | 9/2022 | Assouline | G06T 15/205 |
| 11,763,546 | B1* | 9/2023 | Saraee | G06V 10/761 |
| | | | | 382/157 |
| 11,776,680 | B2* | 10/2023 | Simhadri | G06T 7/248 |
| 11,869,173 | B2* | 1/2024 | Zhou | G06T 5/50 |
| 2019/0043172 | A1* | 2/2019 | Chui | G06N 20/00 |
| 2019/0116322 | A1* | 4/2019 | Holzer | G06T 7/75 |
| 2020/0372621 | A1* | 11/2020 | Naruniec | G06T 7/32 |
| 2021/0042950 | A1* | 2/2021 | Wantland | G06T 7/593 |
| 2021/0090279 | A1* | 3/2021 | Dekel | G06T 7/215 |
| 2022/0036635 | A1* | 2/2022 | Li | G06T 15/04 |
| 2022/0101047 | A1* | 3/2022 | Puri | G06T 5/30 |
| 2022/0130111 | A1* | 4/2022 | Martin Brualla | G06T 17/20 |
| 2022/0237829 | A1* | 7/2022 | Ren | G06T 11/00 |
| 2022/0292649 | A1* | 9/2022 | Wang | G06T 5/005 |
| 2022/0392133 | A1* | 12/2022 | Volkov | G06T 7/70 |
| 2022/0413434 | A1* | 12/2022 | Parra Pozo | H04M 3/568 |

(Continued)

*Primary Examiner* — Shervin K Nakhjavan
(74) *Attorney, Agent, or Firm* — WOMBLE BOND DICKINSON (US) LLP

(57) ABSTRACT

According to one embodiment, a method is provided for video repainting performed by at least one processor of a computer device. The method includes receiving a video sequence having one or more image frames; detecting presences of a target object within the one or more image frames and determining pose condition and style shift of the detected objects; generating content representing a replacement object for the one or more image frames by applying the corresponding pose condition and style shift to the replacement object; and repainting the detected target object in the one or more image frames with the generated content.

18 Claims, 14 Drawing Sheets

(56) References Cited

U.S. PATENT DOCUMENTS

2023/0005108 A1* 1/2023 Gopalkrishna ............ G06T 5/50
2023/0054515 A1* 2/2023 Peng .................... G06V 10/751
2023/0351615 A1* 11/2023 Harbour ................. G06T 7/246
2024/0005547 A1* 1/2024 Lin .......................... G06T 7/70

* cited by examiner

Algorithm 1: Object Detection input : video snippet $V$, target object $O$, pre-trained object detection model $D(\cdot)$ foreach *epoch e* do
    generate a batch of $b$ training image patches $I_i, i \in [1, b]$, each includes up to $c$ transformed objects $O$
    update $D(\cdot)$ using the training image patches end initialize detected object list as empty $D = \{\}$ foreach *video frame $V_j$* do
    detect a list of objects $D_j$ using updated $D(\cdot)$
    append $D_j$ to $D$ end output: List of detected objects $D = \{D_j\}, i \in [1, n]$

FIG. 2

Algorithm 2: Planar Tracking input : video snippet $V$, target object $O$, detected object list $D$ sort $D$ by detection confidence $c_i^D$ detect keypoints and descriptors $(P_O, F_O)$ of target object $O$ $j = 0$ while $D$ is not empty do

$T_j = \{\}$ $f = f_i^b$, where $i$ is object index of the first object in $D$ detect keypoints and descriptors $(P_f, F_f)$ of frame $f$ around $b_i^D$ add $(T_j^f, H_f^f)$ using descriptors matching $(P_O, F_O)$ and $(P_f, F_f)$ foreach $f$ before $f_i^D$ do update $(P_{T_j}, F_{T_j})$ using optical flow add $(T_j^f, H_f^f)$ using descriptors matching break if failed or ended end

$f_j^b = f$ foreach $f$ after $f_i^D$ do update $(P_{T_j}, F_{T_j})$ using optical flow add $(T_j^f, H_f^f)$ using descriptors matching break if failed or ended end update $D$ by removing redundancy from $T_j$ $f_j^e = f, j = j + 1$ end output: List of tracked planar objects $T = \{T_j\}, j \in [1, m]$

FIG. 3

Algorithm 3: Object Masking input : video snippet $V$, target object $O$, tracked object list $T$, pre-trained object detection model $M(\cdot)$ $\hat{T} = \{T_j\}, j \in [1, m]$ foreach *epoch* $e$ do generate a batch of $b$ training image patches $I_i, i \in [1, b]$, each includes a transformed object $O_i$ with corresponding mask $M_i$ update $M(\cdot)$ using the training image patches end foreach $T_j \in T$ do foreach $f \in [f_j^s, f_j^e]$ do generate mask $M_j^f$ for object instance $T_j^f$ append $(T_j^f, H_j^f, M_j^f)$ to $\hat{T}_j$ end end output: Updated list of tracked planar objects $\hat{T} = \{\hat{T}_j\}, j \in [1, m]$

FIG. 4

SYSTEM AND PROCESS FOR REPAINTING OF PLANAR OBJECTS IN VIDEO

TECHNICAL FIELD

Embodiments of the invention relate generally to image/video processing. More particularly, embodiments of the invention relate to a system and process for repainting of planar objects in video.

BACKGROUND

To refill objects in a video, video inpainting is commonly used to fill in contents of missing pixels in a video frame using information from current and neighboring video frames. Unlike video inpainting, a video repainting process can be applied to refill an image area with any contents, including existing contents from current and neighbor video frames or newly created contents.

BRIEF DESCRIPTION OF THE DRAWINGS

Embodiments of the invention are illustrated by way of example and not limitation in the figures of the accompanying drawings in which like references indicate similar elements.

FIG. 2 is a block diagram illustrating pseudocode for object detection in a video snippet according to one embodiment.

FIG. 3 is a block diagram illustrating pseudocode for planar objection tracking in a video snippet according to one embodiment.

FIG. 4 is a block diagram illustrating pseudocode for object masking in a video snippet according to one embodiment.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. Reference in the specification to "image" or "picture" or "video frame" refers to an image obtained from a video sequence of images.

A system is provided for image/video repainting. A video repainting process can be applied to fill a masked area of an image with any contents, including recovered contents or newly created contents. The repainting process identifies a target object, a masked area corresponding to the target object and refill the masked area with newly generated content of visual coherence, e.g., content that is visually consistent with respect to pose, occlusion and visual effects of the replaced content, where visual effects can include, but not limited to, color shift, illumination, clarity and/or noise for the replaced content.

According to an aspect, a method is provided for video repainting performed by at least one processor of a computing system. The method includes receiving a video sequence having one or more image frames; detecting presences of a target object within the one or more image frames and determining pose condition and style shift of the detected objects; generating content representing a replacement object for the one or more image frames by applying the corresponding pose condition and style shift to the replacement object; and repainting the detected target object in the one or more image frames with the generated content.

Figure 1:
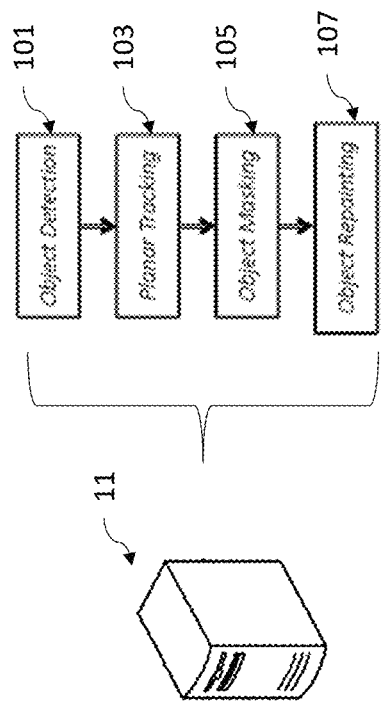
FIG. 1 is a block diagrams illustrating a process for end-to-end video repainting according to some embodiments.

FIG. 1 is a block diagrams illustrating an end-to-end process for video frame repainting according to some embodiments. Processing 100 may be performed by processing logic which may include software, hardware, or a combination thereof. For example, process 100 may be performed by computing system 11 of FIG. 1.

Referring to FIG. 1, given a target object O in a video sequence V (having at least two frames with scene continuity), at block 101, processing logic can perform object detection for target object O in video snippet V.

The goal of the object detection operation is to find instances of target object which are present in any of the video frames, regardless of size, illumination, clarity and/or occlusion. An example of object detection pseudocode is shown in FIG. 2. In one embodiment, a trainable object detection model can be used for object detection following the pseudocode in FIG. 2. The trainable object detection model DO can be implemented as a deep neural network, such as a faster region-based convolutional neural network, or other learning based deep learning neural network models, such as YOLO, R-CNN, faster R-CNN, etc.

To train the object detection model, an operator can generate a dataset with input labels to train the object detection model by forward and backward propagations. For example, an operator can generate a dataset of training image patches, where transformed target objects are included and labeled in the image patches. The included target objects can be randomly transformed from the template image of the target object using one or more of the following transformations:

Color augmentation using variations in hue, saturation and brightness
Homography transformation
Occlusion
Gaussian blur
Motion blur
Gaussian noise Thus, once trained, the object detection model can be used to identify target object having any of the above combinations of transformations in image patches.

For inferencing, referring to FIG. 2, for example, given video sequence or video snippet V, target object O, and object detection model DO, processing logic can generate a list of detected objects $D=\{D_i\}$, where $i \in [1, n]$ using O as the reference target object. Here, each detected object $D_i$ for the video sequence V can include a corresponding bounding box, a corresponding image frame number, and a confidence score corresponding to the detection. E.g., $D_i=(b_i^D, f_i^D, c_i^D)$, where $b_i^D$ is the corresponding bounding box, $f_i^D$ is the frame number and $c_i^D$ is the detection confidence for the ith object.

At block 103, processing logic performs planar tracking of the detected object in the video snippet V.

The goal of the planar tracking operation is to map a list of detected objects D to a list of tracked planar objects $T=\{T_j\}$, $j \in [1, m]$, where j represents an index for each detected object, and m is an integer value representing the total number of tracked objects. For each tracked object $T_j$, the tracked object would be present in a set of at least one of consecutive frames, e.g., from frames $f_j^1$ to $f_j^2$. For the two-dimensional (2D) planar objects, the pose of $T_j^f$ (i.e., the object instance in frame $V_f$) can be represented using the homography transformation matrix $H_j^f$. The homography transformation from target object O to align with $T_j^f$ is achieved by converting pixel coordinates in O to corresponding coordinates of $T_j^f$ using $H_j^f$. Note that for each tracked object, $T_j=\{T_j^f, H_j^f)\}$, $f \in [f_j^1, f_j^2]$.

FIG. 3 is a block diagram illustrating pseudocode for planar objection tracking in a video snippet according to one embodiment. Referring to FIG. 3, for example, given video snippet V, target object O, and a list of detected objects D, processing logic can generate a list of tracked objects $T=\{T_j\}$, $j \in [1, m]$. Here $T_j=\{(T_j^f, H_j^f)\}$, $f \in [f_j^1 f_j^2]$, where $T_j^f$ represents the tracked instance in video frame $V_f$, and $H_j^f$ is the homography transformation matrix representing the pose of $T_j^f$.

At block 105, processing logic performs object masking for the list of tracked objects within the video snippet.

For block 105, processing logic can further refine bounding box of detected objects to a convex quadrilateral, where the convex quadrilateral can be mapped to a mask for each video frame. In one embodiment, the mask can be further corrected to exclude occluded areas of the detected object. Processing logic can then generate a list of tracked objects $\hat{T}=\{\hat{T}_j\}$, $j \in [1, m]$. For each $\hat{T}_j$, an instance in video frame $V_f$, which is denoted as $\hat{T}_j^f$, includes an additional $M_j^f$ representing the masking operation, that is applied to $(T_j^f, H_j^f)$.

Here, $M_j^f$ represents the corresponding visible pixels in video frame $V_f$ which belongs to tracked object $T_j$. An example pseudocode of block 105 is shown in FIG. 4. In one embodiment, $M_j^f$ can be implemented using a trainable object masking model MO. In one embodiment, MO can be a mask region-based convolutional neural network (R-CNN), or other machine learning based models. Note that, mask R-CNN is a deep neural network model that is trained to solve instance segmentation problem in machine learning or computer vision.

Referring to FIG. 4, for example, given input V, O and T, processing logic generates an updated list of tracked objects $\hat{T}=\{\hat{T}_j\}$, $j \in [1, m]$ and where $\hat{T}_j=\{(T_j^f, H_j^f, M_j^f)\}$, $f \in [f_j^1, f_j^2]$. Here, $M_j^f$ represents the corresponding visible pixels in video frame $V_f$ which belong to tracked object instance $T_j^f$.

At block 107, processing logic performs object repainting for the masked tracked objects in the video snippet V.

The goal of the object repainting operation is to refill the masked area with recovered or newly generated contents. In the case of content recovery, a trained image inpainting model can be used to generate restorative content that is then used to replace the masked area for the restoration. In the case of image repainting (which can be different from image inpainting), new content can be generated by applying pose transformation and a style shift model to the template image of replacement object, where the new content is consistent with the original content in terms of pose, occlusion and visual effects, for visual coherence. In one embodiment, pose and occlusion consistency can be preserved by homography transformation and/or target masking as described in blocks 103-105. In one embodiment, visual effects can include color shift, brightness, clarity, noise, etc.

For example, given input V, O, $\hat{T}$ and replacement object R, the object repainting multi-step process is applied to replacement object R for each $T_j^f$, including homography transformation $H_j^f(\cdot)$, style shift $S_j^f(\cdot)$ and masking $M_j^f(\cdot)$. Processing logic generates new content $\hat{R}_j^f$, which can be used to replace pixels in the masked area of $V_f$ with corresponding coordinates. The style shift operation is further described in FIGS. 5-7.

Note that the content generated by style shift model can differ from the neural style transfer (NST) methods. For typical NST methods, a machine learning model is trained to receive a style image S and a content image C to generate new content having content C and style S. For NST, the style image S does not have a corresponding content reference and the style that would be transferred to the content image C is, thus, fully contained in S. For example, the color and tone characteristics of S itself is part of the style to be transferred to the new content. That is, new content will adopt visual styles (including color, texture) of the "style" image S and apply the visual styles to the "content" image C, so a resultant content will have the same content as C (objects in C) but appears as the same visual style as the "style" image S.

In one embodiment, for the "style shift" method, a style shift model can be trained to extract the "style shift" from a pair of source images (reference and shifted images), and during inference, can apply the extracted "style shift" to a replacement image to generate a style shifted image corresponding to the replacement image. The "style shift" can be defined as a transformation between a pair of images having the same content, using a first of the pair as the reference, and a second of the pair as the shifted/transformed version corresponding to the reference (e.g., color/brightness change, noise, blur, etc.).

Repainting can generate new content using replacement object R. In one embodiment, a "style shift" that is applied to replacement object R can be partially derived from a style shift model. For example, the style shift to be transferred to replacement object R can be derived from the style transformation (or style shift) captured by style shift model from model training using training images (e.g., reference and style shifted reference images). In one embodiment, the "style shift" to be applied to replacement object R is partially derived from a target object O. For example, the color and tone of R is not used as features to generate the new content. Instead, color shift and tone mapping from O is transferred to replacement object R. The derivation to further detail the style shift is as follows.

Let's denote the homography transformation process from O to $T_j^f$ to be $H_j^f(\cdot)$, which projects pixels in the original image to an output image by converting pixel coordinates using the transformation matrix $H_j^f$. The inverse homography transformation from $T_j^f$ back to O is denoted as $\overline{H}_j^f$.

The masking process $M_j^f(\cdot)$ can be denoted as:

$$M_j^f(T_j^f) = M_j^f \otimes T_j^f$$

where $M_j^f$ is the binary mask image for $T_j^f$ and $\otimes$ denotes element-wise multiplication. A corresponding masking process applied to target object O can be denoted as $$\overline{M}_j^f(O) = \overline{M}_j^f \otimes O = \overline{H}_j^f(M_j^f) \otimes O$$

Next, a style shift process $S(\cdot)$ can be defined as the transformation from one image (e.g., O) to another image of the same content. In the case of $T_j^f$, $S(\cdot)$ can be denoted as:

$$H_j^f(T_j^f) = S_j^f(O)$$

Therefore, the process of object repainting for one instance of $T_j^f$ could be denoted as:

$$\hat{V}_f(x, y) = \begin{cases} H_j^f(S_j^f(R))(x, y), & \text{if } M_j^f(x, y) > 0 \\ V_f(x, y), & \text{otherwise} \end{cases}$$

Here, $S_j^f(\cdot)$ can maximize consistency in visual effects (color, clarity, noise, etc.), can be used to maintain pose consistency and $M_j^f$ can be used to maintain a same occlusion effect for the tracked objects.

Figure 5:
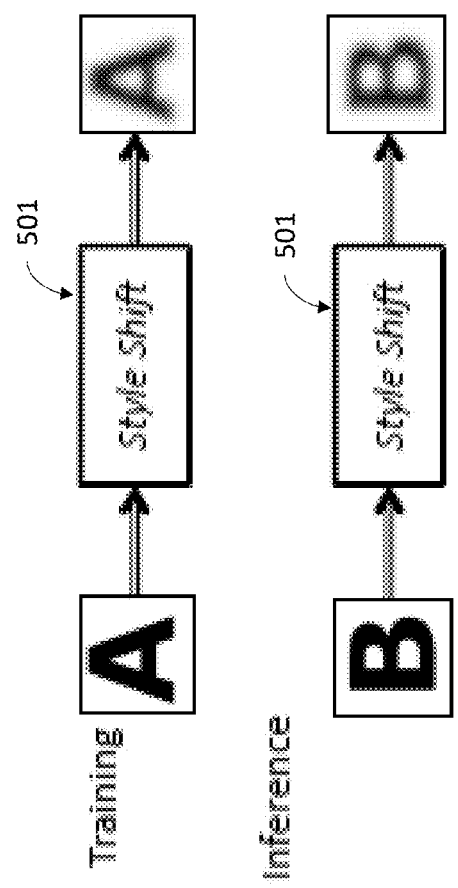
FIG. 5 is a block diagram illustrating a style shift model for training and inferencing according to one embodiment.

For the style shift process $S(\cdot)$, it could be learned in an instance-specific way. That is, a style shift model as shown in FIG. 5 can be used to derive $S(\cdot)$ for each instance $T_j f$ by minimizing the following loss:

$$S_j^f(\cdot) = \operatorname{argmin}_{S(\cdot)} \mathcal{L}(\overline{M}_j^f(S(O)), \overline{M}_j^f(H_j^f(T_j^f)))$$

where $\mathcal{L}(\cdot)$ denotes a loss function, such as L1 loss, L2 loss, mean square error loss, structural similarity index measure (SSIM) loss, or a combination thereof.

Once trained, applying the style shift model to a replacement object R (illustrated as clear image of letter B), e.g., $S_j^f(R)$, generates an output for the replacement object R. As shown in FIG. 5, clear image of letter A can represent target object O and the blurred A can represent an instance of $\overline{H}_j^f(T_j^f)$. Style shift model 501 can thus be trained using this specific pair of images. At inference, the replacement object R (illustrated as clear image of letter B) can be provided to the style shift model 501 to generate style shift content, e.g., the corresponding blurred output of letter B. In one embodiment, a machine learning model can be used to implement style shift model 501.

Figure 6:
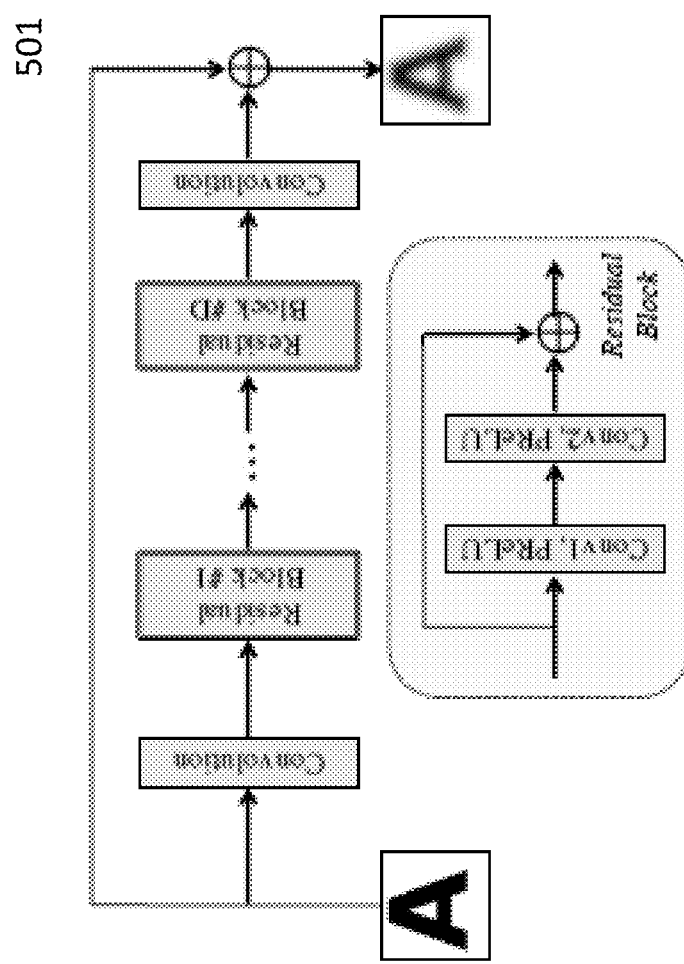
FIG. 6 is a block diagram illustrating a network architecture of a style shift model according to one embodiment.

In one embodiment, style shift model 501 can include a deep neural network, as shown in FIG. 6. For example, style shift model 501 can be a deep convolutional neural network having a number of inner layers, including one or more convolution layers, and/or one or more residual block layers. In one embodiment, the residual block layer can include one or more convolution layers (e.g., Conv1, Conv2) with a skip connection. The convolutional or residual block layers can include a rectified linear unit (ReLU) or a parametric rectified linear unit (PReLU) activation, or any other activations. The convolutional layer can include ReLU activation.

Figure 7:
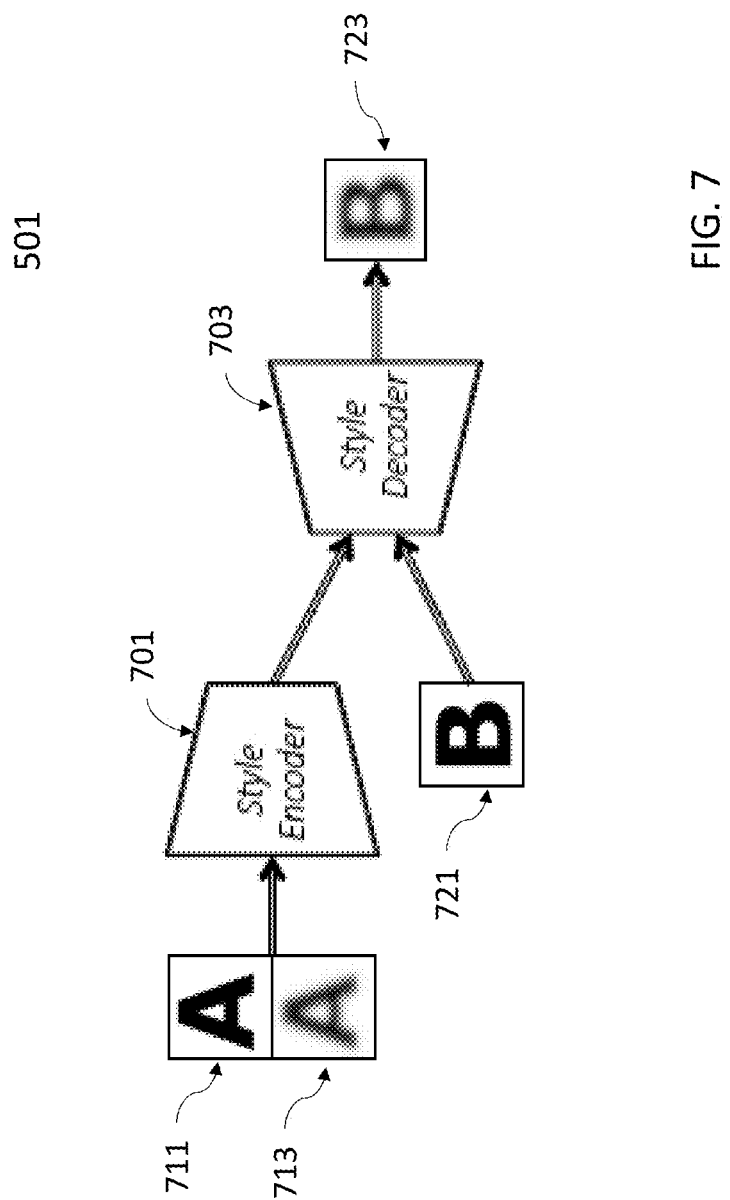
FIG. 7 is a block diagram illustrating an encoder-decoder model for arbitrary style shift according to one embodiment.

In one embodiment, as shown in FIG. 7, style shift model 501 can include an encoder 701 and a decoder 703 that are trainable to transfer an arbitrary style shift to a target image 721 to generate a target image 723 with style shift content, where the arbitrary style shift is encoded from a reference image 711 and a style shifting reference image 713. Thus, once trained, the encoder-decoder based model 501 can represent an arbitrary style shift process $S(\cdot)$. In one embodiment, the arbitrary style shift process $S(\cdot)$ can receive three inputs to generate an output image with style shifting content. For example, during inference, an encoder-decoder model 501 can receive a pair of reference images, e.g., content reference A and style shifting reference A¯, to encode the style shift features. Encoder-decoder model 501 can then receive a replacement object R, e.g., image with object B, and apply the style shift features to replacement object R to generate a resultant image B¯. For each instance $T_j^f$, the style shift process can be as follows:

$$S_j^f(R) = S(R, (O, \overline{H}_j^f(T_j^f)))$$

Figure 8:
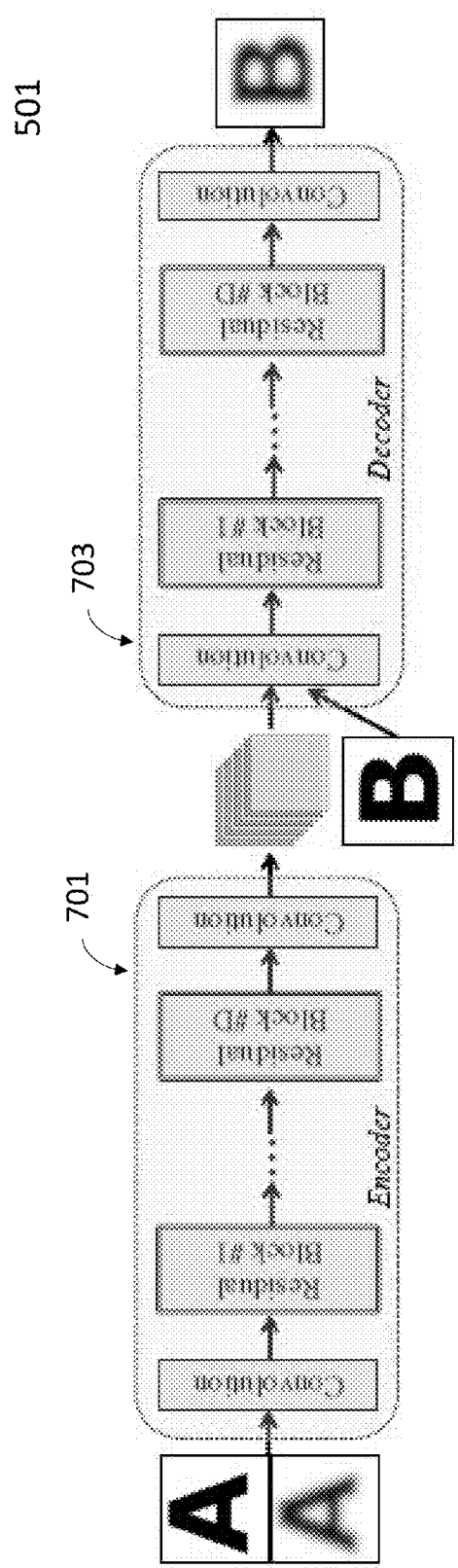
FIG. 8 is a block diagram illustrating a network architecture of an encoder-decoder model for arbitrary style shift according to one embodiment.

An example network architecture 700 for an encoder-decoder style shift transfer model is shown in FIG. 8. As shown, encoder 701 and/or decoder 703 can include a deep convolutional neural network having a number of inner layers. Each inner layer can include one or more convolution layers, and/or one or more residual block layers. In one embodiment, the residual block layer can include one or more convolution layers (e.g., Conv1, Conv2) with a skip connection. The convolutional or residual block layers can include a rectified linear unit (ReLU) or a parametric rectified linear unit (PReLU) activation, or any other activations.

Figure 9:
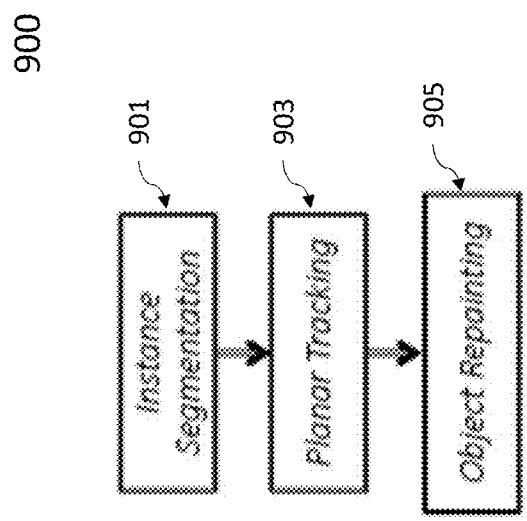
FIG. 9 is a block diagrams illustrating a three-block process for end-to-end video repainting according to one embodiment.

FIG. 9 is a block diagrams illustrating a three-block process for end-to-end video repainting according to one embodiment. Process 900 can represent process 100 of FIG. 1. Processing 900 may be performed by processing logic which may include software, hardware, or a combination thereof. For example, process 900 may be performed by computing system 11 of FIG. 1.

Referring to FIG. 9, at block 901, processing logic performs instance segmentation on a video sequence V. Instance segmentation includes detection and segmentation of multiple instances of a target object O in the video sequence. In this case, object masking step could be merged with block 901. Thus, for the output list of objects D={$D_1$, $D_2$, ..., $D_n$}, each $D_i$ can include an associated segmentation mask $s_i^D$ that is applied to the corresponding object, where i is an integer ranging from 1 to n, and n is a positive integer. In one embodiment, block 901 can be implemented by a trainable instance segmentation model, where the trainable instance segmentation model is trained with a custom dataset similar to the object detection block 101 in FIG. 1, but with segmentation mask features.

At block 903, processing logic performs planar tracking for the detected objects. Here, detected objects are tracked similar to that of block 103 of FIG. 1, with the exception that the detected objects are already applied associated segmentation mask $s_i^D$.

At block 905, processing logic performs object repainting, similar to previously described block 107 of FIG. 1.

Figure 10:
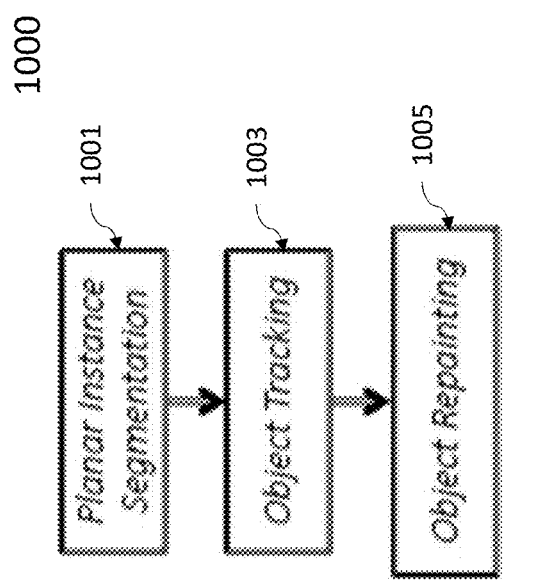
FIG. 10 is a block diagrams illustrating another three-block process for end-to-end video repainting according to one embodiment.

FIG. 10 is a block diagrams illustrating another three-block process for end-to-end video repainting according to one embodiment. Process 1000 can represent process 100 of FIG. 1. Processing 1000 may be performed by processing logic which may include software, hardware, or a combination thereof. For example, process 1000 may be performed by computing system 11 of FIG. 1.

At block 1001, processing logic performs planar instance segmentation on a video snippet V. Planar instance segmentation includes detection and segmentation of multiple instances of a target object O similar to that of block 901 of FIG. 9. In this case, pose estimation function for planar tracking is incorporated into block 1001, where the planar instance segmentation is applied to individual frames independently to conduct instance segmentation and pose estimating simultaneously. Thus, for the output list of objects $D=\{D_1, D_2, \ldots, D_n\}$, each $D_i$ can include an associated homography transformation matrix $h_i^D$ that is applied to the corresponding object. In one embodiment, planar instance segmentation of block 1001 can be implemented using a planar instance segmentation model, as shown in FIG. 11.

Figure 11:
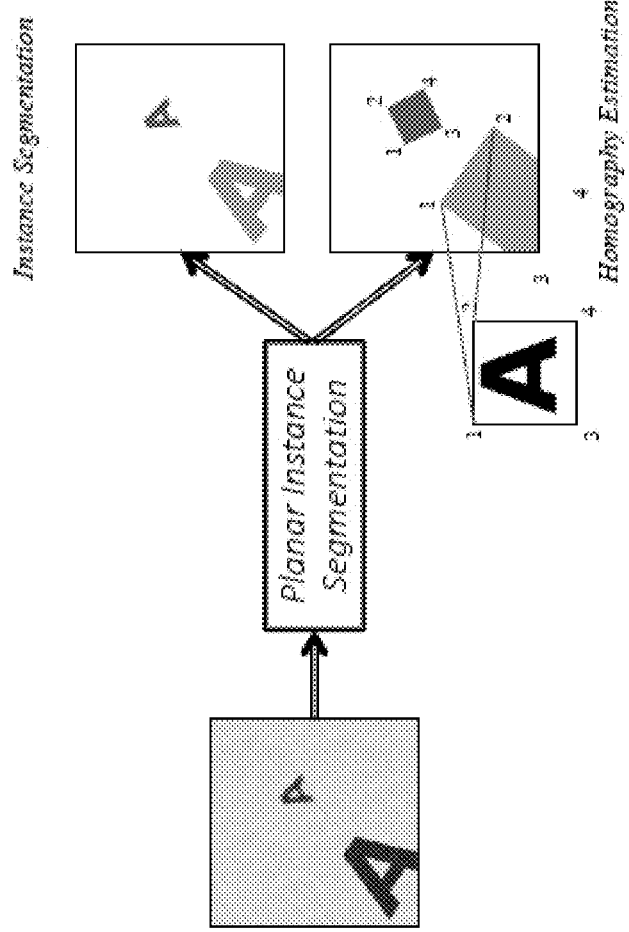
FIG. 11 is a block diagrams illustrating a planar instance segmentation model according to one embodiment.

Referring to FIG. 11, a planar instance segmentation model 1100 can include two output branches. A first output branch can include instance segmentation processing that has an output corresponding to object instance masking, e.g., binary masks. Instance segmentation is the task of detecting each distinct object of interested appearing in an image. A second output branch can include homography estimation processing that has an output corresponding to a homography transformation matrix applied to the target object O. The planar instance segmentation model 1100 can be trained using forward and backward propagation, similar to instance segmentation model of FIG. 9, with the additional instance segmentation and homography information. Once trained, model 1100 can be used for inferencing.

At block 1003, a multiple object tracking method can be used to directly track the instance objects identified by planar instance segmentation at block 1001.

At block 1005, processing logic can perform object repainting on the tracked objects, similar to previously described block 107 of FIG. 1.

Figure 12:
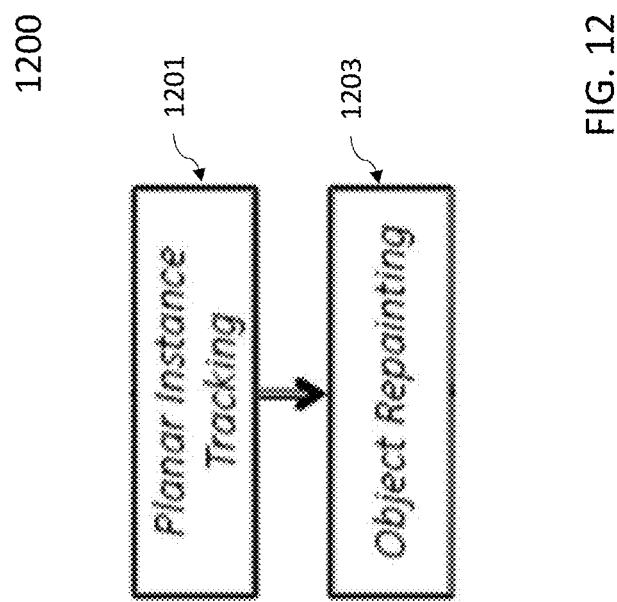
FIG. 12 is a block diagrams illustrating a two-block process for end-to-end video repainting according to one embodiment.

FIG. 12 is a block diagrams illustrating a two-block process for end-to-end video repainting according to one embodiment. Process 1200 can represent process 100 of FIG. 1. Processing 1200 may be performed by processing logic which may include software, hardware, or a combination thereof. For example, process 1200 may be performed by computing system 11 of FIG. 1.

At block 1201, processing logic performs planar instance tracking. In this case, the operation in block 1201 can correspond to operations performed by blocks 101-105. Block 1201 performs simultaneous detection, segmentation and pose tracking of instances of 2D planar objects in videos. In one embodiment, separate machine learning models can be trained independently, and combined for inferencing as a single operation. In another embodiment, a single machine learning model can be trained for all tasks corresponding to blocks 101-105.

At block 1203, processing logic can perform object repainting on the tracked objects, similar to previously described block 107 of FIG. 1.

Figure 13:
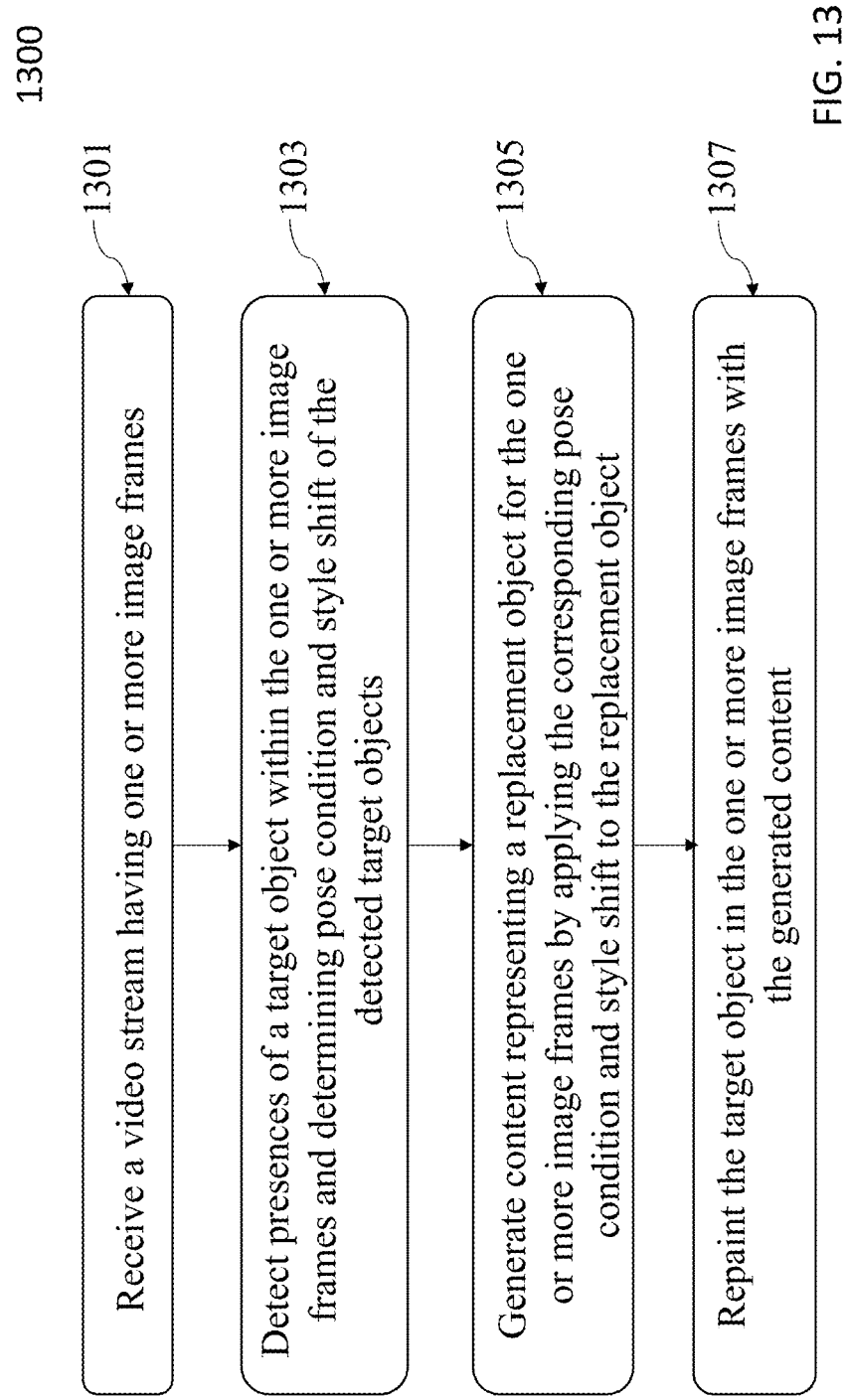
FIG. 13 is a flow diagram illustrating a process according to one embodiment.

FIG. 13 is a flow diagram illustrating a process according to one embodiment. Processing 1300 may be performed by processing logic which may include software, hardware, or a combination thereof. For example, process 1300 may be performed by computing system 11 of FIG. 1.

Referring to FIG. 13, at block 1301, processing logic receives a video sequence having one or more image frames. For example, computing system 11 receives a video snippet V for video processing.

At block 1303, processing logic detects presences of a target object within the one or more image frames and determining pose condition and style shift of the detected target objects. For example, the target object (or an object of interest) can be specified by an operator or can be automatically identified through ruled-based criteria using an object detection algorithm. An example of a target object can be a pre-identified watermark or a logo within a video sequence for video repainting. Processing logic can then detect and track presences of the object of interest (target object), including the pose of the tracked object, using a planar object tracking or similar algorithms.

At block 1305, processing logic generates content representing a replacement object for the one or more image frames by applying the corresponding pose condition and a style shift to the replacement object.

The content can be new content, as previously described for video repainting, where the new content is visually coherent with the replaced content with respect to pose, occlusion and/or visual effects. In one embodiment, visual effects can include color shift, brightness, clarity, noise, etc.

At block 1307, processing logic repaints the target object in the one or more image frames with the generated content. For repainting, image pixels of the replaced content are filled in with pixels corresponding to the new content.

In one embodiment, the style shift corresponds to a change in style specified by the trainable style shift model and the generated content maintains visual coherence with the target object, where visually coherent content is visually consistent with the replaced content with respect to pose, occlusion and/or visual effects. In one embodiment, the trainable style shift model includes a convolutional neural network model that is trained based on at least a reference image and a style shifting reference image, where the style shift corresponds to a change in style from the reference image to the style shifting reference image.

In one embodiment, the trainable style shift model includes an encoder-decoder based style shift model, wherein the encoder-decoder based style shift model includes an encoder coupled to a decoder. In one embodiment, the encoder receives a reference image and a style shifting reference image to extract style shift information from the reference image and the style shifting reference image, where the decoder receives the style shift information and the image frame having the target object to apply the style shift information to the target object in the image frame.

In one embodiment, the method further determines planar object tracking information corresponding to the target object by: determining one or more feature points and associated descriptors for the target object; determining a set of correspondences between target object and the one or more feature points based on the associated descript; and determining a transformation for an image frame based on the set of correspondences using a geometric estimation algorithm, wherein the transformation indicates a pose of the target object within the image frame.

In one embodiment, the method further includes determining mask information corresponding to the target object by applying a trainable mask model to the image frames, where the mask information indicates pixels of the target object in an image frame including any image occlusions; and applying a mask layer to an image frame based on the mask information.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 14:
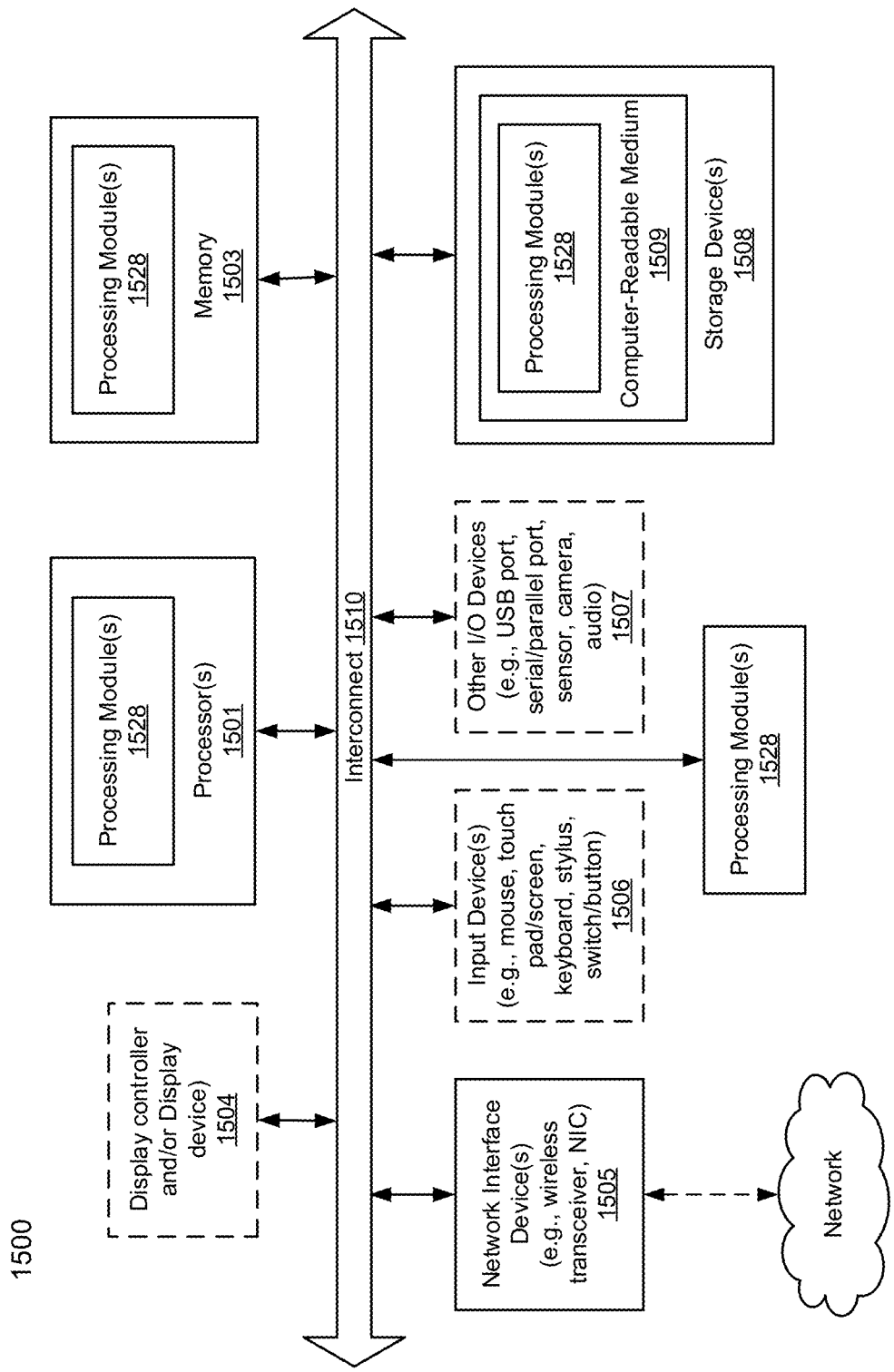
FIG. 14 is a block diagram illustrating a data processing system according to one embodiment.

FIG. 14 is a block diagram illustrating an example of a data processing system which may be used with one embodiment of the invention. For example, system 1500 may represent any of data processing systems described above performing any of the processes or methods described above. For example, system 1500 may represent computing system 11 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include 10 devices such as devices 1505-1508, including network interface device(s) 1505, optional input device(s) 1506, and other optional 10 device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, a video editing component as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method, comprising:
   receiving a video sequence having one or more image frames;

detecting presences of a target object within the one or more image frames and determining pose condition of the detected target objects;

generating content representing a replacement object for the one or more image frames by applying the corresponding pose condition and a style shift to the replacement object;

repainting the target object in the one or more image frames with the generated content;

determining mask information corresponding to the target object by applying a trainable mask model to the image frames, wherein the mask information indicates pixels of the target object in an image frame excluding any image occlusions; and applying a mask layer to an image frame based on the mask information.

2. The method of claim 1, wherein the style shift corresponds to a change in style specified by a trainable style shift model, and the generated content from the replacement object maintains visual coherence with the target object detected in the image frames, including pose, occlusion and/or visual effects.

3. The method of claim 2, wherein the trainable style shift model includes a convolutional neural network model that is trained based on at least a reference image and a style shifting reference image, wherein the style shift corresponds to a change in style from the reference image to the style shifting reference image.

4. The method of claim 2, wherein the trainable style shift model includes an encoder-decoder based style shift model, wherein the encoder-decoder based style shift model includes an encoder coupled to a decoder.

5. The method of claim 4, wherein the encoder receives a reference image and a style shifting reference image to extract style shift information from the reference image and the style shifting reference image, wherein the decoder receives the style shift information and an image of the replacement object to apply the style shift information to the image of the replacement object.

6. The method of claim 1, further comprising determining planar object tracking information corresponding to the target object, including determining one or more feature points and associated descriptors for the target object;

determining a set of correspondences between target object and the one or more feature points based on the associated descriptors; and determining a transformation for an image frame based on the set of correspondences using a geometric estimation algorithm, wherein the transformation indicates a pose of the target object within the image frame.

7. A non-transitory machine-readable medium having instructions stored therein, which when executed by a processor, cause the processor to perform operations, the operations comprising:

receiving a video sequence having one or more image frames;

detecting presences of a target object within the one or more image frames and determining pose condition of the detected target objects;

generating content representing a replacement object for the one or more image frames by applying the corresponding pose condition and a style shift to the replacement object;

repainting the target object in the one or more image frames with the generated content;

determining mask information corresponding to the target object by applying a trainable mask model to the image frames, wherein the mask information indicates pixels of the target object in an image frame excluding any image occlusions; and applying a mask layer to an image frame based on the mask information.

8. The non-transitory machine-readable medium of claim 7, wherein the style shift corresponds to a change in style specified by a trainable style shift model, and the generated content from the replacement object maintains visual coherence with the target object detected in the image frames, including pose, occlusion and/or visual effects.

9. The non-transitory machine-readable medium of claim 8, wherein the trainable style shift model includes a convolutional neural network model that is trained based on at least a reference image and a style shifting reference image, wherein the style shift corresponds to a change in style from the reference image to the style shifting reference image.

10. The non-transitory machine-readable medium of claim 8, wherein the trainable style shift model includes an encoder-decoder based style shift model, wherein the encoder-decoder based style shift model includes an encoder coupled to a decoder.

11. The non-transitory machine-readable medium of claim 10, wherein the encoder receives a reference image and a style shifting reference image to extract style shift information from the reference image and the style shifting reference image, wherein the decoder receives the style shift information and an image of the replacement object to apply the style shift information to the image of the replacement object.

12. The non-transitory machine-readable medium of claim 7, wherein the operations further comprise determining planar object tracking information corresponding to the target object, including determining one or more feature points and associated descriptors for the target object;

determining a set of correspondences between target object and the one or more feature points based on the associated descriptors; and determining a transformation for an image frame based on the set of correspondences using a geometric estimation algorithm, wherein the transformation indicates a pose of the target object within the image frame.

13. A data processing system, comprising:

a processor; and a memory coupled to the processor to store instructions, which when executed by the processor, cause the processor to perform operations, the operations including receiving a video sequence having one or more image frames, detecting presences of a target object within the one or more image frames and determining pose condition of the detected target objects, generating content representing a replacement object for the one or more image frames by applying the corresponding pose condition and a style shift to the replacement object, repainting the target object in the one or more image frames with the generated content;

determining mask information corresponding to the target object by applying a trainable mask model to the image frames, wherein the mask information indicates pixels of the target object in an image frame excluding any image occlusions; and applying a mask layer to an image frame based on the mask information.

14. The system of claim 13, wherein the style shift corresponds to a change in style specified by a trainable style shift model, and the generated content from the replacement object maintains visual coherence with the target object detected in the image frames, including pose, occlusion and/or visual effects.

15. The system of claim 14, wherein the trainable style shift model includes a convolutional neural network model that is trained based on at least a reference image and a style shifting reference image, wherein the style shift corresponds to a change in style from the reference image to the style shifting reference image.

16. The system of claim 14, wherein the trainable style shift model includes an encoder-decoder based style shift model, wherein the encoder-decoder based style shift model includes an encoder coupled to a decoder.

17. The system of claim 16, wherein the encoder receives a reference image and a style shifting reference image to extract style shift information from the reference image and the style shifting reference image, wherein the decoder receives the style shift information and an image of the replacement object to apply the style shift information to the image of the replacement object.

18. The system of claim 13, wherein the operations further comprise determining planar object tracking information corresponding to the target object, including determining one or more feature points and associated descriptors for the target object;

determining a set of correspondences between target object and the one or more feature points based on the associated descriptors; and determining a transformation for an image frame based on the set of correspondences using a geometric estimation algorithm, wherein the transformation indicates a pose of the target object within the image frame.

\* \* \* \* \*